United States Patent Office 3,027,729
Patented Apr. 3, 1962

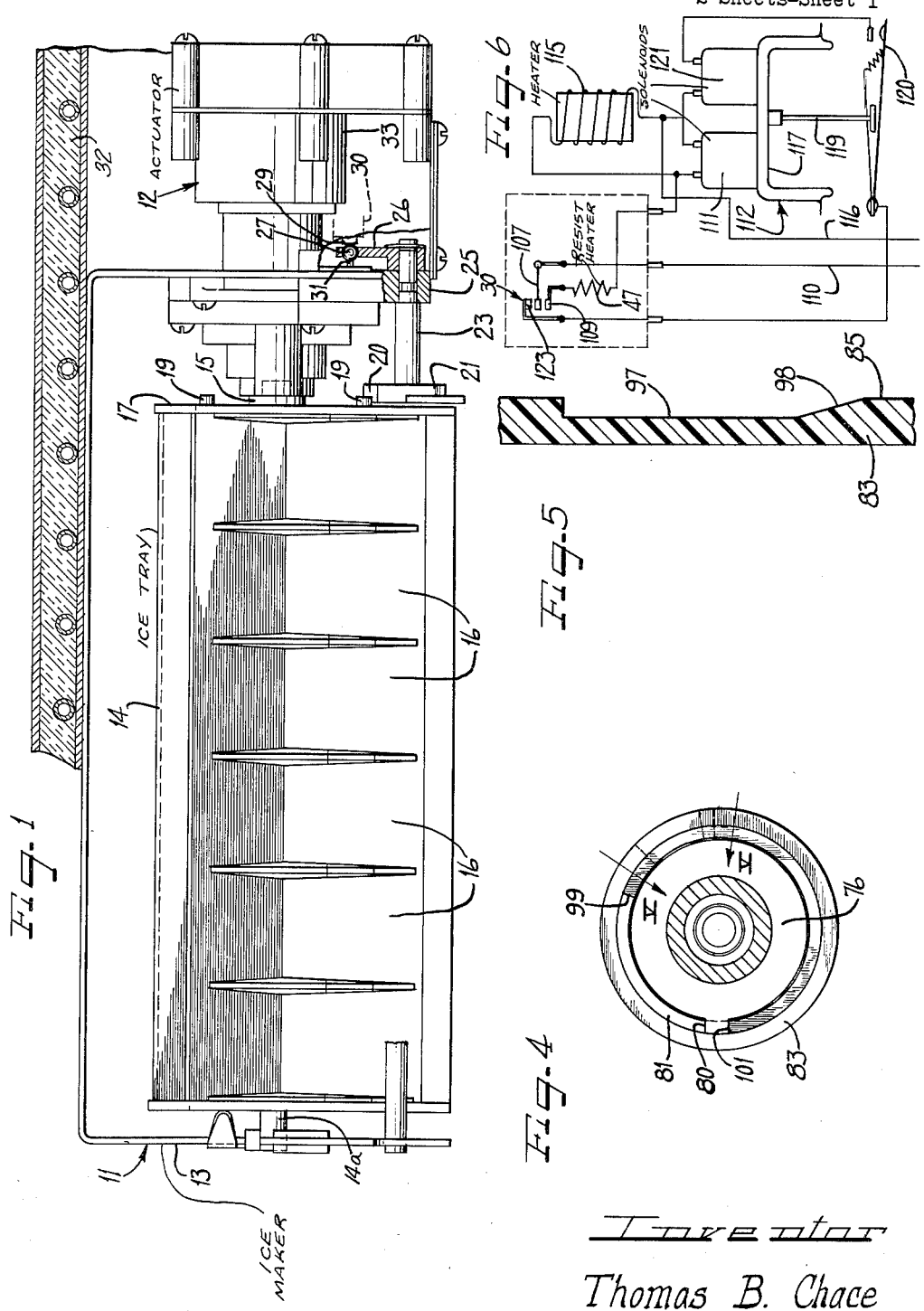

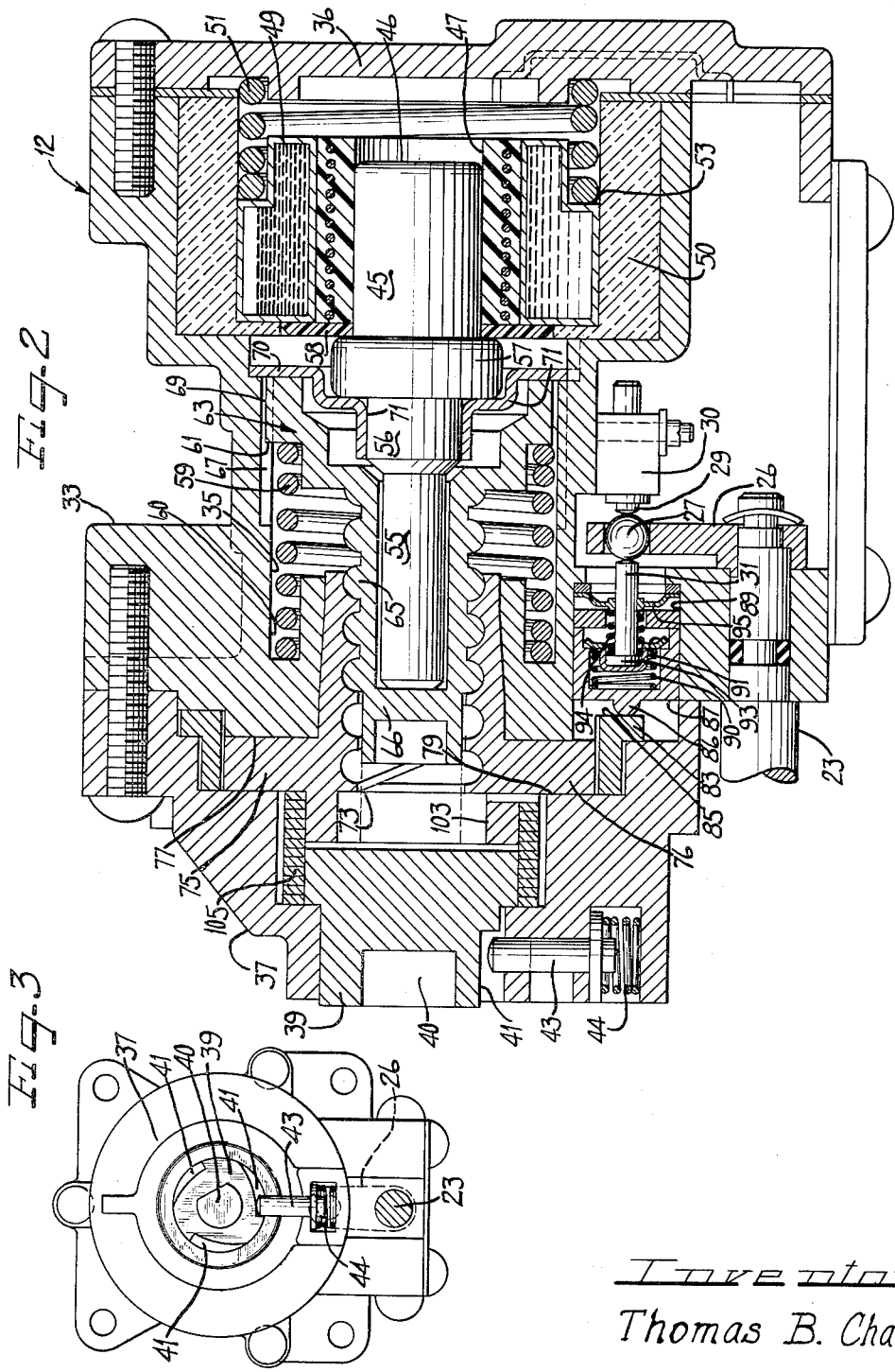

3,027,729
THERMALLY RESPONSIVE ACTUATOR
Thomas B. Chace, Winnetka, Ill., assignor to The Dole Valve Company, Morton Grove, Ill., a corporation of Illinois
Filed Oct. 27, 1958, Ser. No. 769,871
5 Claims. (Cl. 62—135)

This invention relates to improvements in control devices and more particularly relates to an improved form of thermally responsive actuator.

A principal object of the invention is to provide an improved control device wherein a thermally responsive element performs a control operation in the time required for a predetermined change in state to take place.

Another object of the invention is to provide a novel form of thermal actuator in which operation of the actuator is parallel to the freezing of water.

A further object of the invention is to provide a simplified and improved form of thermally responsive actuator particularly adapted for controlling ice makers and the like in which a delay in the operation at low temperature conditions is attained by encasing the thermally responsive element in a liquid having characteristics like the characteristics of the water being frozen.

A further object of the invention is to provide a thermally responsive actuator particularly adapted for ice makers and the like utilizing an electrically heated thermal element and motion converting drive connection therefrom, to effect an ejecting operation during heating of the thermal element and a recycling operation during cooling of the thermal element, in which the cooling time of the thermal element is controlled in accordance with the time of freezing water in the ice molds.

A still further object of the invention is to provide a thermally responsive actuator of the heat motor type in which heating and cooling of the actuator is controlled to effect the carrying out of work operations and the cyclic control of the work operations in predetermined time intervals.

These and other objects of the invention will appear from time to time as the following specification proceeds and with reference to the accompanying drawings wherein:

FIGURE 1 is a fragmentary view in side elevation of a form of ice maker that may be operated and controlled by the actuator of the invention, with certain parts of the actuator broken away and shown in section;

FIGURE 2 is an enlarged longitudinal sectional view taken through the actuator shown in FIGURE 1;

FIGURE 3 is an end view of the actuator shown in FIGURE 2, drawn to a reduced scale and looking at the actuator at the drive end thereof;

FIGURE 4 is a fragmentary end view of the actuator shown in FIGURE 2 with the end cap removed and with certain other parts broken away and in section in order to illustrate the drive connection to the cam ring for controlling operation of the actuator.

FIGURE 5 is an enlarged fragmentary sectional view taken through the cam ring substantially along line V—V of FIGURE 4; and FIGURE 6 is a schematic wiring diagram illustrating an application to which the actuator of the invention may be put.

In the embodiment of the invention illustrated in the drawings, I have shown in FIGURE 1 for the purposes of illustrating an application of the device of the invention, an ice maker 11 of the rotatable tray automatic self-releasing type, and have shown an actuator 12 for carrying out the ice making cycles and rotating the ice tray in position to eject ice cubes therefrom.

The ice maker 11 is shown as including a rotatable tray 14 having oppositely facing ice molds and mounted at its ends in a frame 13 on studs 14a and 15 projecting from opposite ends of said tray. The ice tray 14 is shown as being of a form somewhat similar to that shown and described in application Serial No. 740,898, now Patent No. 2,939,298, filed June 9, 1958 by Carl C. Bauerlein and entitled "Self-Releasing Ice Mold," so need not herein be shown or described in detail.

The ice tray 14 has three sets of ice molds 16 spaced 120° apart and is rotatably moved by the actuating and control device 12 to bring an empty set of ice molds into an upwardly facing position to be filled with water, and to bring the frozen ice pieces into position to be discharged by gravity by the heat of the water filling the upwardly facing ice molds, releasing the bonds between the downwardly facing ice pieces and their molds by thawing the surfaces of the ice pieces, for discharge into a storage basket (not shown).

An end wall 17 of the ice tray 14 is shown as having camming lugs 19 projecting therefrom toward the actuating and control device 12 for engaging a camming face 20 of an ice level sensing arm 21, mounted on the inner end of a longitudinally extending shaft 23, rotatably mounted in a casing 25 for the actuating and control device 12. The ice level sensing arm 21 may be like that shown and described in an application Serial Number 763,254 by Carl C. Bauerlein, filed on September 25, 1958, now Patent No. 2,998,708, dated September 5, 1961, so need not be shown or described herein except to point out that the ice level sensing arm operates a control arm 26 on the inner end of the shaft 23, to bring a ball 27 on the end of said arm out of registry with a push-button 29 of a control switch 30, and out of registery with a plunger 31 operating and controlling operation of said push-button and switch, to prevent operation of the ice maker when the storage basket (not shown) for the ice pieces in full, and the arm resting on the ice pieces is tilted to bring the ball 27 out of registry with the switch 29 and the plunger 31.

The actuator 12 and ice trays 14 are contained in an evaporator compartment 32 of a refrigerator and the actuator is shown as including a casing 33 having a stepped generally cylindrical chamber 35 therein, closed at one end by an end cover 36 and at its opposite end by an end cap 37 having a driving member 39 rotatably carried therein. The driving member 39 is shown as having an irregular drive socket 40 therein, engaging the pin or stud 15, to effect rotatable movement of the ice tray 14 step by step upon operation of the actuator, as will hereinafter more clearly appear as the specification proceeds.

The driving member 39 is herein shown as having three ratchet teeth 41 formed in the periphery thereof engaged by a pawl in the form of a plunger 43 pressed into engagement with the ratchet teeth by a spring 44 to index the position of the ice tray 14. It should here be understood that where the actuator is used for other purposes than to rotatably drive an ice tray, like the ice tray 14, that the ratchet teeth may be dispensed with.

A thermal responsive element 45 is shown as being mounted in the chamber 35 and as having a casing 46 containing a fusible thermally expansible material and extending within a resistor heater 47 carried in a hollow cylindrical well 49 filled with liquid to provide a heat retaining well or sink. The hollow well 49 when filled with liquid retains heat in the casing 46 and the fusible material therein to delay cooling of thermally expansible material within said casing, and also to delay heating of said casing, to effect the carrying out of a freezing cycle prior to rotating the tray 14 into an ice releasing position only when water in the ice molds is frozen.

The liquid in the well 49 may have characteristics like the characteristics of the water being frozen, to attain parallel operation of the thermal element with freezing of the water in the ice molds, or may have different characteristics to vary the operation if desired.

While I have shown liquid in the well 49 for retarding the cooling of the thermally expansible material within the casing 46, the well may be solid and may be made from metal to provide different temperature control characteristics of the control device, if required.

The well 49 is slidably mounted in a heat insulator 50 and is yieldably retained to said heat insulator by an over-travel spring 51 seated at one end in the end cover 36 and at its opposite end in a shouldered portion 53 of the well 49. The overtravel spring 51 normally acts as a solid member and only yields to prevent damage to the thermal element upon overtravel of a power member or piston 55 of the thermal element, upon excessive temperature conditions.

The thermal responsive element 45 is similar to that shown and described in Patent No. 2,368,181, which issued to Sergius Vernet on January 30, 1945, and is of the so-called power or high motion solid fill type of thermal element. In such thermal elements a fusible thermally expansible material within the casing 46 acts agnaist a flexible membrane or diaphragm (not shown) to extensibly move the power member or piston 55 from a cylinder 56 of the thermal element, upon fusion of the thermally expansible material. The thermally expansible material may be a wax, or a wax and a powdered metal heat conductor and a binder, the particular material used being selected for the desired temperature range of operation of the thermal element and the required sensitiveness to changes in temperature.

The casing 46 of the thermal element 45 extends through a washer or disk 58, seated on the inner end of the well 49 and abutted by a clamping ring 57, clamping the casing 46 to the cylinder 56 of the thermal element.

The piston 55 is returned within the cylinder 56 upon certain low temperature conditions by a return spring 59, seated at one end in an annular recessed portion 60 of the chamber 35. The opposite end of the return spring 59 is seated on a shoulder 61 of an operator 63 having a hollow shaft portion 65 extending along the piston 55 and having a closed end 66 abutted by the end of the piston 55. The operator 63 is retained from turning movement with respect to the chamber 35 by key slots 67 engaged by splines or keys 69 extending along the base of the operator. The return spring 59 biases the operator 63 into engagement with the end of the piston 55 and also biases the base of the operator 69 into engagement with a stop flange 70 of a retainer 71, when the thermal element 45 has cooled below the temperature of fusion of the thermally expansible material contained within the casing 46. The retainer 71 is mounted on the cylinder 61 of the thermal element and serves to limit inward movement of the operator 63 and thereby limits travel of the spring 59 and return movement of the power member 55.

The shaft portion 65 of the operator 63 is shown as being externally threaded. The threads of the threaded portion of the shaft portion 65 may be double threads of relatively steep pitch and engage internal threads 73 in a drive member 75, rotatably mounted within the casing 33. The drive member 75 has a flanged portion 76 abutting an end wall 77 of the casing 33 and abutted by an inner face 79 of the end cap 37, retaining the drive member 75 from axial movement and accommodating said drive member to rotatably move upon extensible movement of the piston 55 and the shaft portion 65 of the operator 63 along the threads 73 of said drive member.

The flange 76 of the drive member 75 has a lug 80 extending axially therefrom (FIGURE 4). The lug 80 is movable along an upwardly opening slot 81 formed in the annular wall of a cam ring 83, extending about the periphery of the flange 76 and rotatably mounted in the outer end portion of the casing 33 and the end cap 37. The cam ring 83 is picked up by the lug 80 toward opposite ends of the strokes of the piston 55, to effect rotatable movement of said cam ring to operate and control operation of the switch 30.

The cam ring 83 has an annular camming face 85 engaging a follower end 86 of a switch operator 87, slidably mounted in a chamber 89 within the casing 33. The switch operator 87 controls operation of the plunger 31 through a spring 90, seated within said operator and seated at its opposite end on a cap 91 mounted on a head 93 on the inner end of the plunger 31. A second spring 94, stronger than the spring 90, is seated at one end on the head 91 of the plunger 31, and at its opposite end in a spider 95 and biases the plunger 31 into a retracted position.

The cam face 85 has a recessed portion 97 having a sloping face 98 sloping to the cam face 85 (FIGURE 5) along which the follower 86 moves into the recessed portion 97, upon turning of the cam ring 83 in a clockwise direction as the lug 80 engages an end wall 99 of the slot 81. When the follower 86 moves into the slot 97, the spring 94 will move the plunger 93 away from the ball 27, and accommodate the switch 30 to move into one position by the bias of the switch.

When the cam ring 83 is rotated in an opposite direction, as the piston 55 is rotated by the spring 59, the lug 80 will come into engagement with an end wall 101, of the slot 81, moving the cam ring 83 in a direction to cause the follower 86 to ride outwardly along the slope 98 of the cam. This will depress the plunger 31 and the switch button 29 and will complete an energizing circuit to the resistor heater 47, heating the casing 46 and the thermally expansible material contained therein, at the termination of the cooling cycle of the thermal responsive element 45.

The flanged portion 76 of the drive member 75 has an annular drive portion 103 extending outwardly from said flanged portion, about which is coiled a spring 105, forming a one-way spring clutch driving the driving member 39 from the drive member 75 in a direction to turn the tray 14 to accommodate the frozen ice pieces to be released therefrom by gravity, as the bond between the ice pieces and their molds is broken by thawing, by the heat of the water filling the upwardly facing molds. The one-way spring clutch may be of a form well known to those skilled in the art, in which the spring winds up and grips the driving member 39 in one direction of rotation of the drive member 75, and unwinds and releases the driving member 39 in an opposite direction of rotation of the drive member 75, so need not herein be shown or described in detail.

Referring now to FIGURES 4, 5 and 6, when the actuator 12 is cold, the lug 80 will be in engagement with the end wall 101 of the slot 81. The follower 86 will also be on the high part of the cam face 85. A movable switch arm 107 of the switch 30 will be in position to engage a stationary contact 109 and complete an energizing circuit to the resistor heater 47, through a main line conductor 110, contacts 107 and 109 of the switch 30, a solenoid coil 111, energizable to admit water to a metering device 112, through an electric heater 115, energizable to heat the water supplied to the metering device, and through a conductor 116.

The filling of the metering device with warm water for supply to the ice molds 16 will then start, it being understood that water supplied to the ice tray 14 by the metering device 112 is heated by the electric heater 115 to a temperature sufficient to readily release the downwardly facing ice pieces from their molds. The temperature of the water for efficient release of the ice pieces may be from 120° to 180° Fahrenheit. The water temperature, however, may be higher or lower dependent upon the desired speed of release of the ice pieces. The metering device 112 may be like that shown and described in the aforementioned Carl C. Bauerlein application Serial No. 763,254, now Patent No. 2,998,708 so need not herein be shown or described further.

As the resistor heater 47 is energized to heat the casing 46 and the thermally expansible material contained therein, the piston 55 will extensibly move from the cylinder 56. This will effect the turning of the drive member 75 in a clockwise direction, by the threaded connection between the shaft portion 65 of the operator 63 and the internal threads 73 of the drive member 75. The lug 80 will then move along the slot 81 away from the end wall 101 toward the end wall 99. The cam ring 83 will remain stationary and the switch 30 will maintain an energizing circuit to the resistor heater 47, the solenoid coil 111 and electric heater 115. Water will continue to flow into the metering device moving a diaphragm 117 and arm 119 of the metering device to close the contacts of a snap acting switch 120 when the metering device is full. This will condition a solenoid coil 121 of the metering device to be energized through a stationary contact 123 of the switch 30.

Upon continued extensible movement of the piston 55, with a corresponding continued rotational movement of the drive member 75 and ice tray 14, the lug 80 will come into engagement with the end wall 99 of the slot 81. This will effect turning movement of the cam ring 83 into a position to accommodate the follower 86 to ride along the sloping cam surface 98 into the depressed portion 97 of the cam. This will relieve pressure from the push button 29. The switch arm 107 of the switch 30 will move out of engagement of the stationary contact 109 and move into engagement with the stationary contact 123. The resistor heater 47, solenoid coil 111 and the electric water heater 115 will then be deenergized. An energizing circuit will then be completed to the solenoid coil 121 through the stationary contact 123 and the upwardly facing molds will be filled with arm water. The built-up heat in the casing 46 and thermally expansible material contained therein, retained by the liquid in the well 49 will, however, cause continued extensible movement of the piston 55 and rotation of the drive member 75 and the ice tray 14. Extensible movement of the piston 55 will then stop and the thermally responsive element will start to cool, the cooling time being delayed by the well 49 and liquid therein, which will freeze as the water in the ice molds freezes and will also delay heating of the thermal element upon energization of the resistor heater 47. Movement of the piston 55 will, therefore, be in parallel relation with respect to the freezing of water in the ice molds, assuring that the water in the upwardly facing ice molds 16 is frozen prior to rotation of the tray 14 to a discharge position.

Return movement of the piston 55 will rotate the drive member 75 in a counterclockwise direction and move the lug 80 along the slot 81 from the end wall 99 toward the end wall 101. The lug 80 engaging the end wall 101 will then pick up the cam ring 83 and reverse the direction of rotation thereof, causing the follower 86 to move along the slope 98 of the cam ring 83, and thereby depress the switch button 29 and move the switch arm 107 into engagement with the stationary contact 109 and again complete an energizing circuit to the resistor heater 47, the solenoid coil 111 and the electric water heater 115, assuming the ice level sensing arm 21 is in the position shown in FIGURE 1. The thermal element and actuator will then be conditioned to carry out a second operating cycle and effect turning movement of the tray 14 into position to bring an empty set of molds 16 into an upwardly facing position for filling, and the frozen water in the next advance set of molds into position to accommodate the ice pieces to be thawed by the heat of the warm water filling the empty molds, as in the aforementioned companion application Serial No. 763,254, now Patent No. 2,998,708.

It may be seen from the foregoing that a simple and effective thermal actuator has been provided, in which a work and control operation is performed by extensible movement of the power member of the thermal responsive element and a control or work operation may be performed during and at the end of retractable movement of the power member of the thermal responsive element, and that the time of cooling the thermally expansible material, with the resultant return of the power member of the thermal responsive element, times an operating cycle, which in the present illustrative example is a freezing cycle of water in the ice cube trays.

It may also be seen that the thermally responsive element is particularly adapted to be cyclically heated to perform a work operation during expansion of the thermally expansible material of the thermally responsive element, and to perform a control operation by the sensing of low temperature conditions.

It may further be seen that the provision of the hollow metal well or heat sink, filled with liquid, provides a timed operation of the control device, parallel to the freezing of water and the like, assuring that certain control operations in an ice making cycle will not be carried out until the water is frozen.

While I have herein shown and described one form in which my invention may be embodied, it should be understood that various modifications and variations in the invention may be effected, without departing from the spirit and scope of the novel concepts thereof, as defined by the claims appended hereto.

I claim as my invention:

1. In a thermally responsive actuator adapted for operation in the evaporator compartment of a refrigerator to effect predetermined operations as a function of changes in state of a main body of liquid from a liquid to a solid state, a thermally responsive element having a casing containing a thermally responsive material, an actuator extensibly and retractibly movable with respect to said casing in response to changes in temperature of the thermally responsive material, and a liquid chemically different from said thermally responsive material contained about said casing but exterior thereto and subjected to similar temperature changes as said main body of liquid and having change of state characteristics similar to those of said main body of liquid and controlling retractible movement of said actuator in accordance with the changes of state of said main body of liquid from a liquid to a solid state.

2. In a thermally responsive actuator adapted for operation in the evaporator compartment of a refrigerator to effect predetermined operations as a function of changes in state of a main body of liquid in the evaporator compartment, a thermally responsive element having a casing containing a fusible thermally responsive material and an actuator extensible and retractibly movable with respect to said casing, means for heating said casing to effect extensible movement of said actuator, spring means for retractibly moving said actuator, and a body of liquid chemically different from said thermally responsive material contained about said casing but exterior thereto and subjected to similar temperature changes as said main body of liquid and having change of state characteristics similar to those of said main body of liquid and controlling retractible movement of said actuator in accordance with a change in state of said main body of liquid from a liquid to a solid state.

3. In a thermally responsive actuator adapted for operation in the evaporator compartment of a refrigerator to effect predetermined operations as a function of changes in state of the main body of liquid, a thermally responsive element having a casing containing a fusible thermally responsive material and an actuator extensibly and retractibly movable with respect to said casing, a resistor heater for heating said casing and the thermally responsive material contained therein to effect extensible movement of said actuator, spring means for retractibly moving said actuator, switch means actuated by retractible movement of said actuator to energize said resistor heater and reset said actuator and deenergizing said resistor heater at the end of extensible movement of said actuator to accommodate said spring means to retractibly move said actuator, a hollow well enclosing said casing and filled with liquid chemically different from the thermally responsive material and having change of state characteristics similar to those of said main body of liquid and controlling retractible movement of said actuator in accordance with the time required for the main body of liquid to change its state from a liquid to a solid state.

4. In a thermally responsive actuator adapted for operation in the evaporator compartment of a refrigerator to effect predetermined operations as a function of changes in state of a main body of liquid from a liquid to a solid state, a thermally responsive element having an extensible and retractibly movable actuator, a resistor heater for heating said thermally responsive element to effect extensible movement of said actuator and reset said actuator, spring means retractibly moving said actuator upon deenergization of said resistor heater, a rotatable drive member, motion converting drive means between said actuator and said rotatable drive member converting the rectilinear movement of said actuator to rotational movement, a cam encircling said rotatable drive member, a lost motion connection from said cam to said rotatable drive member effecting rotational movement of said cam in opposite directions toward the ends of extensible and retractible movement of said power member, a switch operated by said cam at the end of retractible movement of said actuator for energizing said resistor heater to reset said actuator and deenergizing said resistor heater at the end of the extensible movement of said actuator to accommodate retractible movement of said actuator to effect a work operation at the end of retractible movement thereof, and means controlling retractible movement of said actuator comprising a body of liquid separate from the main body of liquid and contained about said thermally responsive element in heat sensing relation with respect thereto.

5. In a thermally responsive actuator adapted for operation in the evaporator compartment of a refrigerator to effect predetermined operations as a function of changes in state of a main body of liquid from a liquid to a solid state, a thermally responsive element having a casing containing a thermally responsive material and an actuator extensibly and retractibly movable with respect to said casing, a resistor heater for heating said casing and the thermally responsive material contained therein to effect extensible movement of said actuator, spring means retractibly moving said actuator upon deenergization of said resistor heater, a rotatable drive member, a motion converting drive connection between said actuator and said rotatable drive member converting the motion of said actuator to rotational motion and rotatably driving said rotatable drive member, a cam encircling said rotatable drive member, a lost motion connection from said cam to said rotatable drive member effecting operation of said cam toward the ends of extensible and retractible movement of said actuator, a switch operated by said cam at the end of retractible movement of said actuator for energizing said resistor heater to reset said actuator and deenergizing said resistor heater at the end of extensible movement of said actuator, a hollow wall extending about said casing and filled with liquid having change of state characteristics similar to those of a main body of liquid and remote from said main body of liquid and controlling retractible movement of said actuator to effect a work operation upon a change in state of the main body of liquid from a liquid to a solid state.

References Cited in the file of this patent
UNITED STATES PATENTS

| | | |
|---|---|---|
| 1,441,549 | Wells | Jan. 9, 1923 |
| 2,187,258 | Wood | Jan. 16, 1940 |
| 2,322,762 | Malone | June 29, 1943 |
| 2,453,851 | Miller | Nov. 16, 1948 |
| 2,512,212 | Molotzak | June 20, 1950 |
| 2,622,923 | Cobb | Dec. 23, 1952 |
| 2,808,707 | Chace | Oct. 8, 1957 |
| 2,833,507 | Dube et al. | May 6, 1958 |
| 2,907,179 | Frei | Oct. 6, 1959 |
| 2,928,280 | Frei | Mar. 15, 1960 |
| 2,941,379 | Nelson | June 21, 1960 |